(12) United States Patent
Ide (10) Patent No.: US 12,345,889 B2
(45) Date of Patent: Jul. 1, 2025

(54) VIRTUAL IMAGE DISPLAY DEVICE

(71) Applicant: SEIKO EPSON CORPORATION, Tokyo (JP)

(72) Inventor: Mitsutaka Ide, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 517 days.

(21) Appl. No.: 17/876,729

(22) Filed: Jul. 29, 2022

(65) Prior Publication Data
US 2023/0031714 A1 Feb. 2, 2023

(30) Foreign Application Priority Data
Jul. 30, 2021 (JP) .................. 2021-125110

(51) Int. Cl.
*G02B 27/01* (2006.01)
*G02B 27/09* (2006.01)

(52) U.S. Cl.
CPC ..... *G02B 27/0172* (2013.01); *G02B 27/0972* (2013.01); *G02B 27/0983* (2013.01)

(58) Field of Classification Search
CPC ............ G02B 27/0172; G02B 27/0983; G02B 2027/013
See application file for complete search history.

(56) References Cited

U.S. PATENT DOCUMENTS

| 2003/0063400 | A1  | 4/2003 | Sunaga et al. |
| 2020/0033607 | A1* | 1/2020 | Takeda ............... G02B 27/0172 |
| 2020/0132919 | A1* | 4/2020 | Cakmakci .......... G02B 27/0172 |

FOREIGN PATENT DOCUMENTS

JP 2003-005074 A 1/2003

* cited by examiner

*Primary Examiner* — Joseph P Martinez
(74) *Attorney, Agent, or Firm* — Oliff PLC (57) ABSTRACT

A virtual image display device includes a display element that emits an image light, a prism on which the image light from the display element is incident, a first mirror that reflect the image light from the prism, a second mirror that reflects the image light reflected by the first mirror, and a third mirror that guides the image light reflected by the second mirror to a position of an exit pupil, wherein the prism includes an incident portion on which image light from the display element is incident, the incident portion includes a first incident region and a second incident region, and a distance from the first incident region to the display element is greater than a distance from the second incident region to the display element.

14 Claims, 8 Drawing Sheets

VIRTUAL IMAGE DISPLAY DEVICE

The present application is based on, and claims priority from JP Application Serial Number 2021-125110, filed Jul. 30, 2021, the disclosure of which is hereby incorporated by reference herein in its entirety.

BACKGROUND

1. Technical Field

The present disclosure relates to a virtual image display device that allows observation of a virtual image formed by an image light generating unit, etc.

2. Related Art

As a reflective optical element, there is known an optical element which has three or more reflective surfaces to guide a light flux and can be used as an observation optical system of a head-mounted display (HMD) (JP-A-2003-5074).

However, in the above-described technique, for example, when an angle of view is intended to be enlarged, there is a possibility that it is necessary to increase the size of the reflective surface.

SUMMARY

A virtual image display device according to one aspect of the present disclosure includes an image light generating unit that generates an image light, an optical member on which the image light from the image light generating unit is incident, a first mirror that reflects the image light from the optical member, a second mirror that reflects the image light reflected by the first mirror, and a third mirror that reflects, toward a position of an exit pupil, the image light being reflected by the second mirror, wherein the optical member includes a first incident region and a second incident region on which the image light from the image light generating unit is incident, and a distance from the first incident region to the image light generating unit is greater than a distance from the second incident region to the image light generating unit.

DESCRIPTION OF EXEMPLARY EMBODIMENTS

First Embodiment

Hereinafter, an example of the structure, operation, etc. of a virtual image display device according to the present disclosure will be described with reference to FIG. 1 etc.

Figure 1:
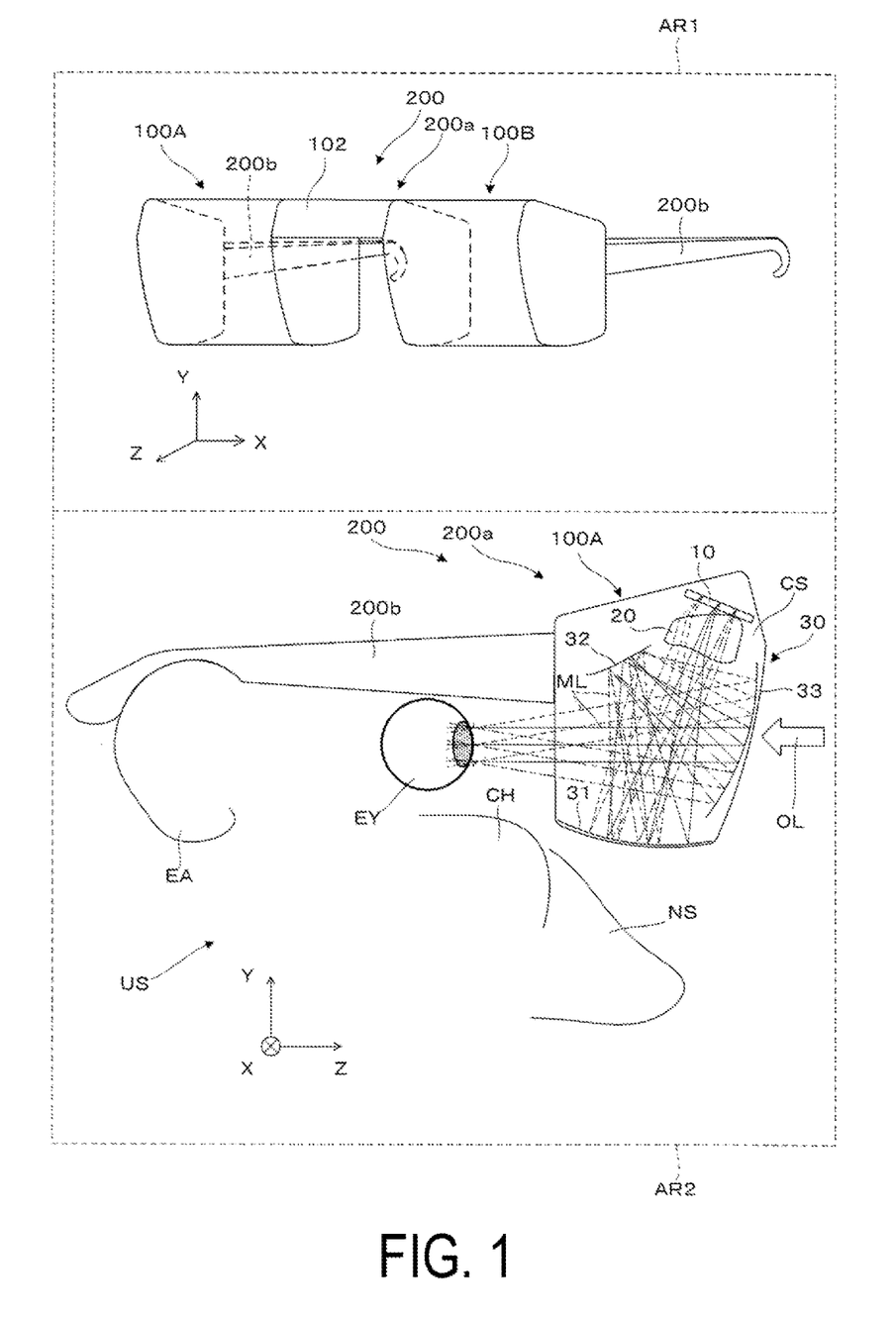
FIG. 1 is a conceptual diagram schematically illustrating a virtual image display device according to a first exemplary embodiment.

FIG. 1 is a diagram conceptually illustrating the virtual image display device 200, in which a perspective view schematically illustrating an external appearance of the virtual image display device 200 is illustrated in a first region AR1, and an internal structure related to an optical system is schematically illustrated in a second region AR2.

The virtual image display device 200 is a head-mounted display (hereinafter, also referred to as an HMD), and is an image display device that causes an observer or wearer US who is a user wearing the HMD to recognize video as a virtual image. In FIG. 1, etc., X, Y, and Z are an orthogonal coordinate system, a +X direction corresponds to a transverse direction in which the two eyes EY of an observer or wearer US who is wearing the virtual image display device (or HMD) 200 are disposed, a +Y direction corresponds to an upward direction orthogonal to the transverse direction in which the two eyes EY of the wearer US are disposed, and a +Z direction corresponds to a direction to the front or a forward direction for the wearer US. A +Y direction is parallel to a vertical axis or a vertical direction. In the following description, an upward direction, a downward direction, or an upper side and a lower side mean a +Y direction and a −Y direction.

The virtual image display device 200 includes a main body 200a disposed so as to cover the front of the wearer US, and a pair of support members 200b having a shape of temples that support the main body 200a. The main body 200a includes a first display device 100A for a right eye, a second display device 100B for a left eye, and a bridge portion 102 provided between the first display device 100A and the second display device 100B and coupled thereto. Further, although detailed illustration is omitted, for example, a nose pad (nose rest portion), etc. is provided at the main body 200a, and the virtual image display device 200 has an eyeglasses-like shape as a whole, and can be removed as a whole.

Note that in the second region AR2, the first display device 100A is illustrated as a representative of the left-right symmetric first display device 100A and the second display device 100B constituting the virtual image display device 200. Since the second display device 100B for the left eye has the same structure as that of the first display device 100A, detailed description thereof is omitted.

As illustrated in the drawing, the first display device 100A includes, as portions having optical functions, a display element 10, which is an image light generating unit that emits image light ML, a prism 20 that is an optical member on which the image light ML from the display element 10 is incident, and a reflective optical element 30 that is configured by three reflection members (a first mirror 31, a second mirror 32, and a third mirror 33) that reflect the image light ML from the prism 20. These members are accommodated in a housing CS and fixed in place. Note that the housing CS can be constituted of various shapes and materials within a range that does not affect the optical function of the first display device 100A.

The virtual image display device 200 is supported by an ear EA, a nose NS, etc. of the wearer US, and when the image light ML emitted from the display element 10 of the first display device 100A reaches the eye EY, an image as a virtual image is visually recognized. Also, external light OL is also visually recognized beyond the third mirror 33 of the first display device 100A. That is, in this case, the third mirror 33 functions as a half mirror that reflects part of the image light ML and transmits part of the external light OL.

Hereinafter, an outline of an optical path of the image light ML (light guide of the image light ML) in the virtual image display device 200 will be described with reference to a conceptual side cross-sectional view illustrated as FIG. 2. Note that in FIG. 2, a central light flux (central component CL) of the image light ML emitted from the display element 10 is illustrated. In other words, here, the optical path is traced for the component of the image light ML that is emitted from the center of the display element 10 (center point CO of a light emission surface 10a of the display element 10).

First, the image light ML is projected in a direction having a component in the downward direction (−Y direction), and enters and refracts from the incident portion 21 of the prism 20, and is emitted by further refraction in the emitting portion 22. The image light ML having passed through the prism 20 is first reflected by the first mirror 31 located at the lowest position among the first mirror 31, the second mirror 32, and the third mirror 33 which are three reflection members located below the prism 20 and constituting the reflective optical element 30, and travels toward the second mirror 32 located in a direction having a component in the upward direction (+Y direction). That is, the first mirror 31 is located below the prism 20 and the second mirror 32 when mounted, and reflects the image light ML projected downward from the prism 20 upward.

The image light ML having passed through the first mirror 31 is reflected by the second mirror 32 and is again directed downward, and then is incident on the third mirror 33. The third mirror 33 bends the image light ML from the second mirror 32 parallel to an exit pupil PP that is to be a position of the eye EY of the wearer US. When the arrangement of the first mirror 31 is described from the position of the exit pupil PP, the first mirror 31 is located below the prism 20 and the second mirror 32 with respect to the position of the exit pupil PP, and the first mirror 31 reflects the image light ML projected from the prism 20 to the second mirror located above the position of the exit pupil PP.

Further, in the above description, as illustrated in the drawing, the optical path of the image light ML from the prism 20 to the first mirror 31 intersects with the optical path of the image light ML from the second mirror 32 to the third mirror 33, and intersects with the optical path of the image light ML from the third mirror 33 toward the position of the exit pupil PP. In other words, the prism 20 is configured to project, toward the first mirror 31, the image light ML to intersect with an optical path of the image light ML reflected by the second mirror 32 toward the third mirror 33 and an optical path of the image light ML reflected by the third mirror 33 toward the position of the exit pupil PP. In this manner, in the reflective optical element 30, the optical path of the image light ML is bent so as to intersect over a plurality of times, and thus, the entire optical system is miniaturized while having a certain optical path length.

In addition, as described above, as another optical aspect, the prism 20 and the first mirror 31 which are optical members collectively function as a convex lens. Further, in the illustrated example, an intermediate image IM is formed between the second mirror 32 and the third mirror 33.

Also, the third mirror 33 has semi-transmissive properties, and transmits part of the external light OL from the outside.

On the other hand, as described above, the third mirror 33 functions as a half mirror that turns back (bends) the part of the image light ML reflected by the second mirror 32 toward the second mirror 32 and transmits another part of the image light ML. That is, in the virtual image display device 200, a see-through type optical system is configured in which the image light ML and the external light OL are visually recognized in an superimposed manner.

Figure 3:
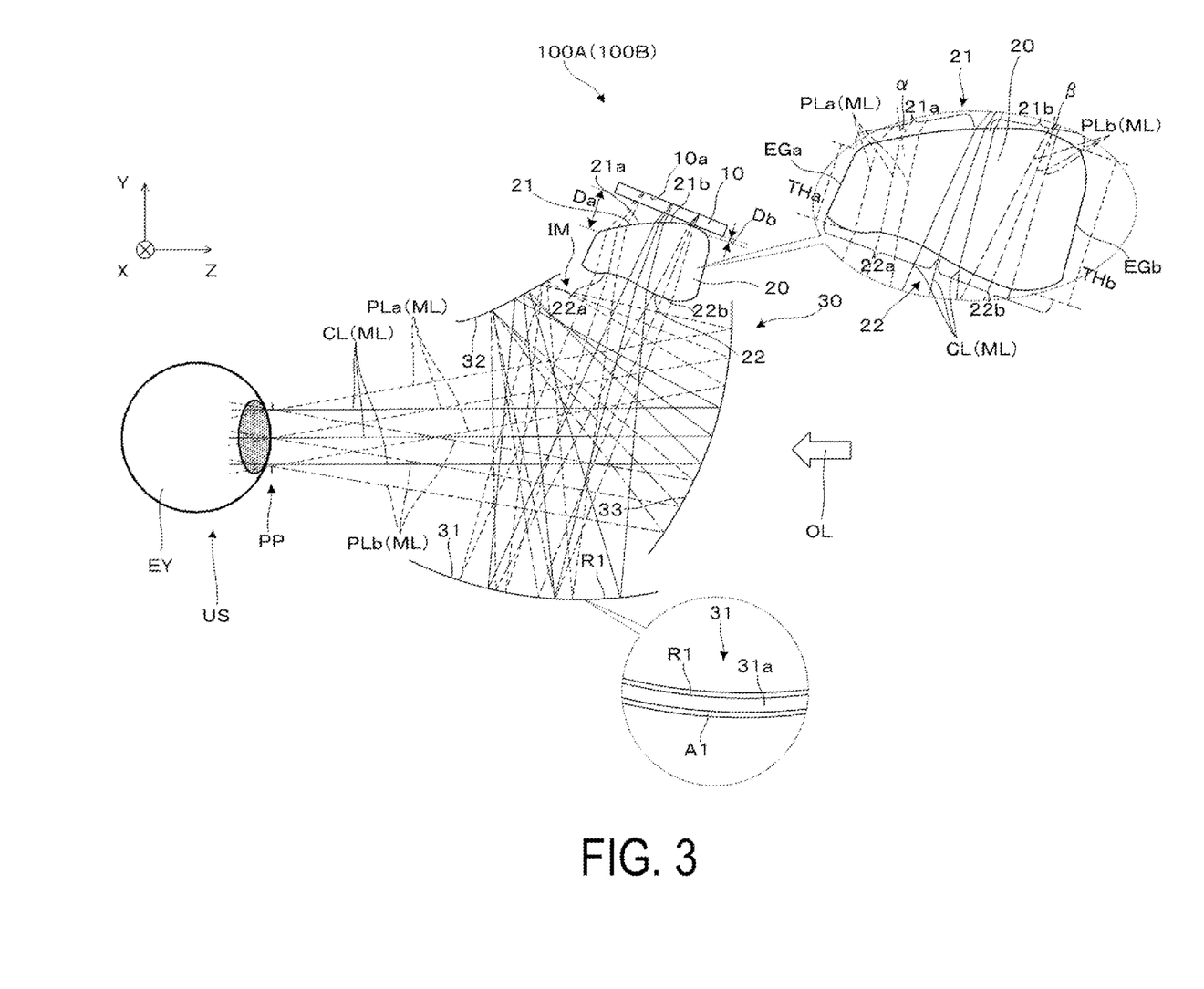
FIG. 3 is a side cross-sectional view for explaining each portion of an optical system constituting the virtual image display device.
Figure 4:
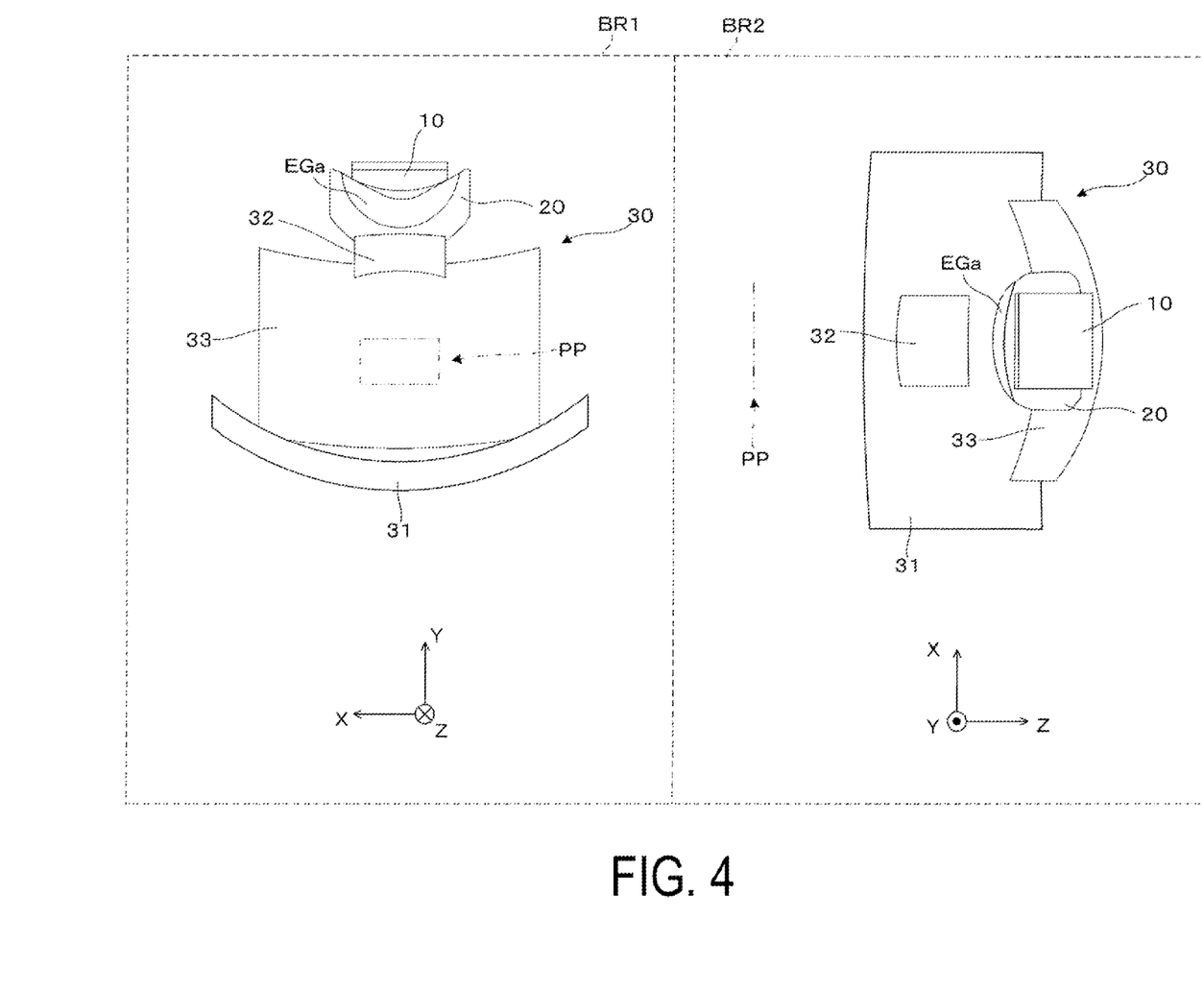
FIG. 4 is a diagram for describing a configuration of the virtual image display device.
Figure 5:
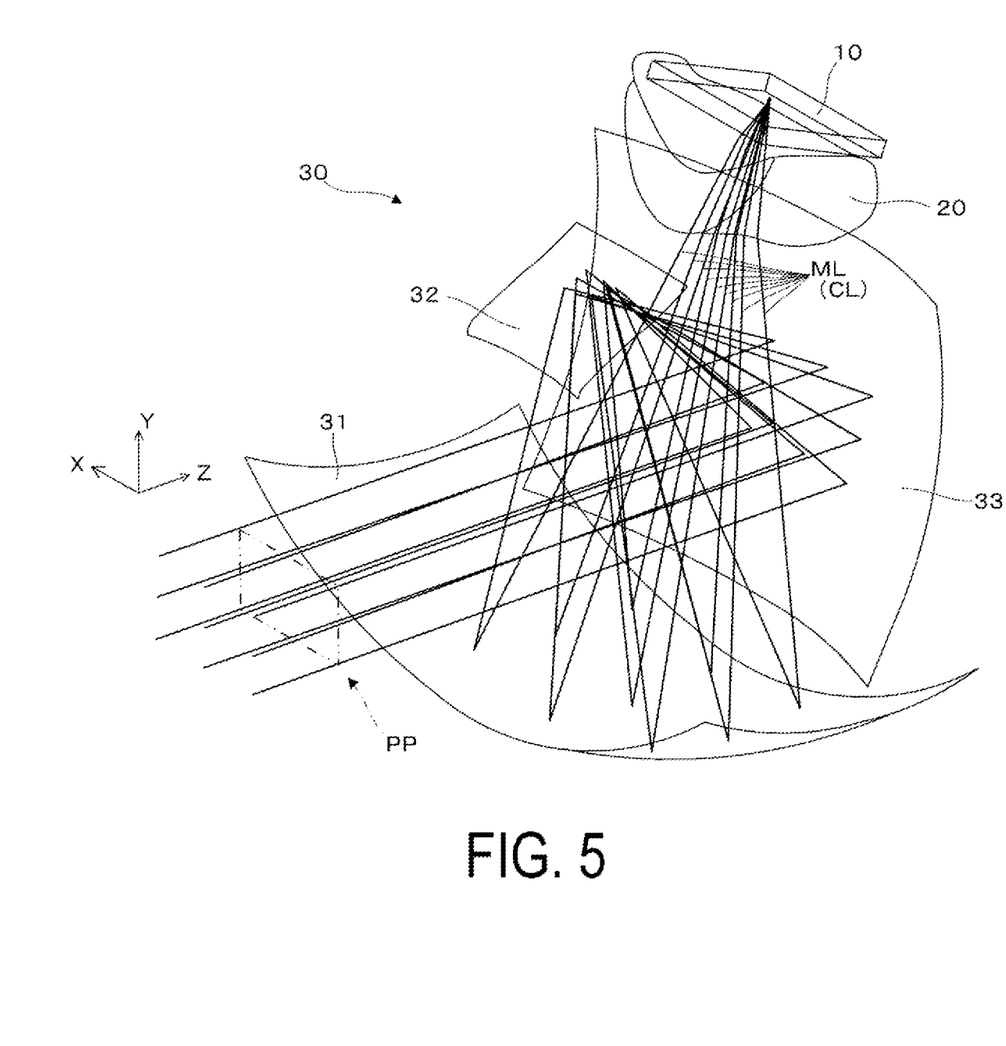
FIG. 5 is a perspective view illustrating the configuration of the virtual image display device.

Hereinafter, with reference to FIG. 3, etc., a configuration of each of the above-described units, a difference due to an optical path of the image light ML, etc. will be described in more detail. FIG. 3 is a side cross-sectional view for describing each portion of the optical system constituting the virtual image display device 200, where in addition to the central component CL which is a component of the central light flux in the image light ML, a first peripheral component PLa emitted from a side closer to the wearer US (eye EY) and a second peripheral component PLb emitted from a side farther from the wearer US (eye EY) in the light emission surface 10a are illustrated as components of peripheral light fluxes. In the drawing, the central component CL is indicated by a solid line, and among the peripheral components, the first peripheral component PLa is indicated by a dashed line, and the second peripheral component PLb is indicated by a dot-dash line. FIG. 4 is a conceptual diagram for describing the configuration of the optical system of the virtual image display device 200, where the first region BR1 illustrates the arrangement of each portion or the optical system by a front view, and the second region BR2 illustrates the arrangement of each portion of the optical system by a plan view. FIG. 5 is a perspective view illustrating a configuration of the virtual image display device 100. In FIG. 5, the image light ML is illustrated with the central component CL as a representative.

The display element 10 illustrated in FIG. 3, etc. is the image light generating unit that emits the image light ML as described above. The display element (image light generating unit) 10 can be configured by various devices. For example, the display element 10 can be configured by a self-luminous display device, and in this case, the display element 10 includes a light emitting portion in order to generate the image light ML. More specifically, the display element 10 is configured by, for example, an organic EL (Organic Electro-Luminescence) display. Here, as an example, the display element 10 is configured by an organic EL display and emits light including various polarizing directions (for example, non-polarized light) as the image light ML from the light emission surface 10a, that is, forms a color still or moving image on the two dimensional light emission surface 10a. However, the display element 10 is not limited to the above-described aspect using the organic EL display, and can be replaced with a micro LED display, or a display device using an inorganic EL, an organic LED, a laser array, a quantum dot light-emitting element, etc. Further, the display element 10 is not limited to a spontaneous light emission type image light generation device, and may include an LCD and another light modulation element, and may form an image by illuminating the light modulation element with a light source (light emitting portion) such as a backlight. As the display element 10, a liquid crystal on silicon (LCOS) (LCoS is a registered trademark), a digital micro-mirror device, etc. may be used instead of an LCD.

The prism 20 is an optical refractive optical element (lens) that is disposed between the display element 10 and the first mirror 31 on the optical path of the image light ML, refracts and transmits the image light ML emitted from the display element 10, and causes the image light ML to be incident on the first mirror 31. As illustrated in FIGS. 3 to 5, the optical system is disposed asymmetrically, has an optical surface that is non-axisymmetric, and is an off-axis optical system, where the optical surface includes a free-curved surface. Therefore, the image light ML has a different degree of refraction (refraction angle) for each position at the time of incidence or emission depending on the incidence position with respect to the prism 20. In particular, in the exemplary embodiment, as illustrated in FIG. 3, a first incident region 21a and a second incident region 21b are provided at the incident portion 21 on which the image light ML is incident in the prism 20. The first incident region 21a is a region on the side close to the wearer US (eye EY), that is, the −Z side in the incident portion 21, and the second incident region 21b is a region on the side far from the wearer US (eye EY), that is, the +Z, side in the incident portion 21. Here, as illustrated, a distance Da from the first incident region 21a to the display element (image light generating unit) 10 is greater than a distance Db from the second incident region 21b to the display element 10. That is, the incident position of the first peripheral component PLa indicated by the dashed line among the peripheral components of the image light ML on the incident portion 21 is farther than the incident position of the second peripheral component PLb indicated by the dot-dash line on the incident portion 21. Here, the distances from the incident regions 21a and 21b to the display element 10 can be variously defined. For example, the distances can be defined by the smallest value or the largest value among the distances of straight lines coupling one point on the light emission surface 10a forming the light emission side of the display element 10 and one point on the incident regions 21a and 21b.

Further, as illustrated in FIG. 3 in which a portion of the prism 20 is enlarged, the incident angle of the image light ML to the incident portion 21 is also different between the first incident region 21a and the second incident region 21b, and the incident angle of the image light ML to the first incident region 21a (incident angle α of the first peripheral component PLa) is greater than the incident angle of the image light ML to the second incident region 21b (incident angle β of the first peripheral component PLa). That is, $\alpha > \beta$ is satisfied, and among the image light ML incident on the incident portion 21, the component (first peripheral components PLa) incident on the first incident region 21a is refracted more than the component (second peripheral components PLb) incident on the second incident region 21b. That is, the first incident region 21a refracts the first peripheral component PLa, which is a component of the image light ML incident on the first incident region 21a, more than the second peripheral component PLb, which is a component of the image light ML incident on the second incident region 21b.

Further, from a different point of view, in the illustrated example, the distance from the first incident region 21a to the third mirror 33 is greater than the distance from the second incident region 21b to the third mirror 33. Here, the distances from the incident regions 21a and 21b to the third mirror 33 can be variously defined. For example, the distances can be defined by the smallest value among the distances coupling one point on the mirror surface representing the third mirror 33 and one point on the incident regions 21a and 21b.

In addition, the prism 20 has, as side surface portions, a first end portion EGa extending from the first incident region 21a and forming a side surface on the −Z side, and a second end portion EGb extending from the second incident region 21b and forming a side surface on the −Z side. In the drawing, the first end portion EGa is thinner than the second end portion EGb. That is, as illustrated in the drawing, when a thickness THa of the first end portion EGa and a thickness THb of the second end portion EGb in the direction along the light flux center of the image light ML (the normal direction of the light emission surface 10a) are compared with each other as viewed from the normal direction of the virtual cross section including the first mirror 31, the second mirror 32, and the prism 20 with respect to the light flux center of the image light ML, the value of the thickness THa is smaller than the value of the thickness THb.

Also, in the illustrated example, the distance from the first end portion EGa to the third mirror 33 is greater than the distance from the second end portion EGb to the third mirror 33. Note that the distance here can be defined similarly to the example described above.

Further, in the emitting portion 22 of the prism 20 which emits the image light ML incident from the incident portion 21, a first emission region 22a which occupies a side coupled to the first end portion EGa, that is, the −Z side, and a second emission region 22b which occupies a side coupled to the second end portion EGb, that is, the +Z side are provided. The first emission region 22a includes a concave surface, and the second emission region 22b includes a convex surface. That is, the first emission region 22a has a surface that is concave inward in a direction along the center of the light flux of the image light ML (normal direction of the light emission surface 10a), and the second emission region 22b has a surface that is convex outward in a direction along the center of the light flux of the image light ML (normal direction of the light emission surface 10a).

Also, in the illustrated example, the distance from the first emission region 22a to the third mirror 33 is greater than the distance from the second emission region 22b to the third mirror 33. Note that the distance here can be defined similarly to the example described above.

Since the prism 20 has the asymmetric shape as described above, the prism 20 serves as an optical member on which the image light ML from the display element (image light generating unit) 10 is incident and which emits the image light ML toward the first mirror 31, and can avoid or suppress an increase in size of the first mirror 31. That is, in the case of the present exemplary embodiment, in the prism 20 of the virtual image display device 200, the peripheral component of the image light ML is prevented from expanding with the wide angle of view of the image.

The first mirror 31 is disposed on the light emission side of the prism 20, and reflects (back) the image light ML emitted from the prism 20. Note that the first mirror 31 reflects the image light ML at a high efficiency due to the mirror reflection, that is, reflects 100% or nearly 100% of the image light ML.

As illustrated in a partially enlarged view of the first mirror 31 in FIG. 3, the first mirror 31 is formed by forming a reflective film R1 on a resin-made base material 31a by mirror deposition, etc. In addition, for example, a light absorption film A1 may be provided at a surface of the base material 31a opposite to the surface at which the reflective film R1 is provided in order to prevent leakage light. Note that in this case, the light absorption film A1 may function as a counter film for maintaining the shape of the base material 31a (which does not cause shape change) during the film formation of the reflective film R1. Alternatively, it is conceivable that the light absorption film A1 is a film for exclusively functioning as a counter film and has no light absorption action. By providing the counter film, it is possible to maintain the shape of the reflective surface with necessary accuracy even when the base material 31a is thin (for example, about 1 mm) and has a certain degree of curvature to form a reflective surface by a free-curved surface.

Also, as illustrated in FIGS. 3 to 5, the first mirror 31 has a free-curved surface similar to the incident portion (incident surface) 21, the emitting portion (emission surface) 22, or the other reflection member (second mirror 32, third mirror 33) of the prism 20. Furthermore, the first mirror 31 has a free-curved surface and functions as a convex lens together with the prism 20, thereby converging the entire light flux of the image light ML and directing the light flux toward the second mirror 32. This reduces the size of the second mirror 32.

As described above, the second mirror 32 is disposed on the light emission side of the first mirror 31, and the image light ML bent (reflected) at the first mirror 31 is further reflected (back) and emits the image light ML toward the third mirror 33. In the illustrated example, the second mirror 32 is provided above (on the +Y side of) the third mirror 33, and the image light ML is projected obliquely downward from the second mirror 32 toward the third mirror 33. Accordingly, since the third mirror 33 is a half mirror, even when a partial component of the image light ML is transmitted through the third mirror 33, it is possible to avoid or reduce a situation in which the transmitted component enters eyes of person other than the wearer and an image is viewed.

Similarly to the first mirror 31, the second mirror 32 has a free-curved surface and reflects the image light ML at a high efficiency due to the mirror reflection, that is, reflects 100% or nearly 100% of the image light ML. As for the structure, similarly to the first mirror 31, it is conceivable that a reflective film is formed at the surface of the resin-made base material 31a by mirror deposition, etc., and a light absorption film is further provided (not illustrated).

The third mirror 33 is a half mirror having semi-transmissive properties as described above, and is disposed on the light emission side of the second mirror 32. The image light ML having passed through the second mirror 32 is partially reflected by the third mirror 33. Here, the image light ML reflected by the third mirror 33 is directed toward the exit pupil PP, which is the assumed position of the eye EY (the position of the exit pupil). For example, the reflective component of the image light ML in the third mirror 33 with respect to the central component CL is directed toward the −Z direction and reaches the exit pupil PP. The first peripheral component PLa and the second peripheral component PLb, which are reflective components other than the central component CL, similarly reach the exit pupil PP. The exit pupil PP is at a position where the image light ML from each point on the light emission surface 10a is incident so as to be superimposed from the angle direction corresponding to the position of each point on the light emission surface 10a in a predetermined divergence state.

Note that various configurations are conceivable for the reflection transmittance in the third mirror 33 as the half mirror, but it is conceivable to form a half mirror film such that the reflectance is approximately 50%, and the transmittance is approximately 50%, for example. In the case of the present exemplary embodiment, the first mirror 31 and the second mirror 32 other than the third mirror 33 are high-efficiency reflection mirrors, and the image light ML passes through the third mirror 33 only once. Therefore, it is possible to maintain high utilization efficiency of the image light ML as the entire optical system compared to, for example, a birdbath type optical system that passes through a half mirror, etc. over a plurality of times.

Figure 6:
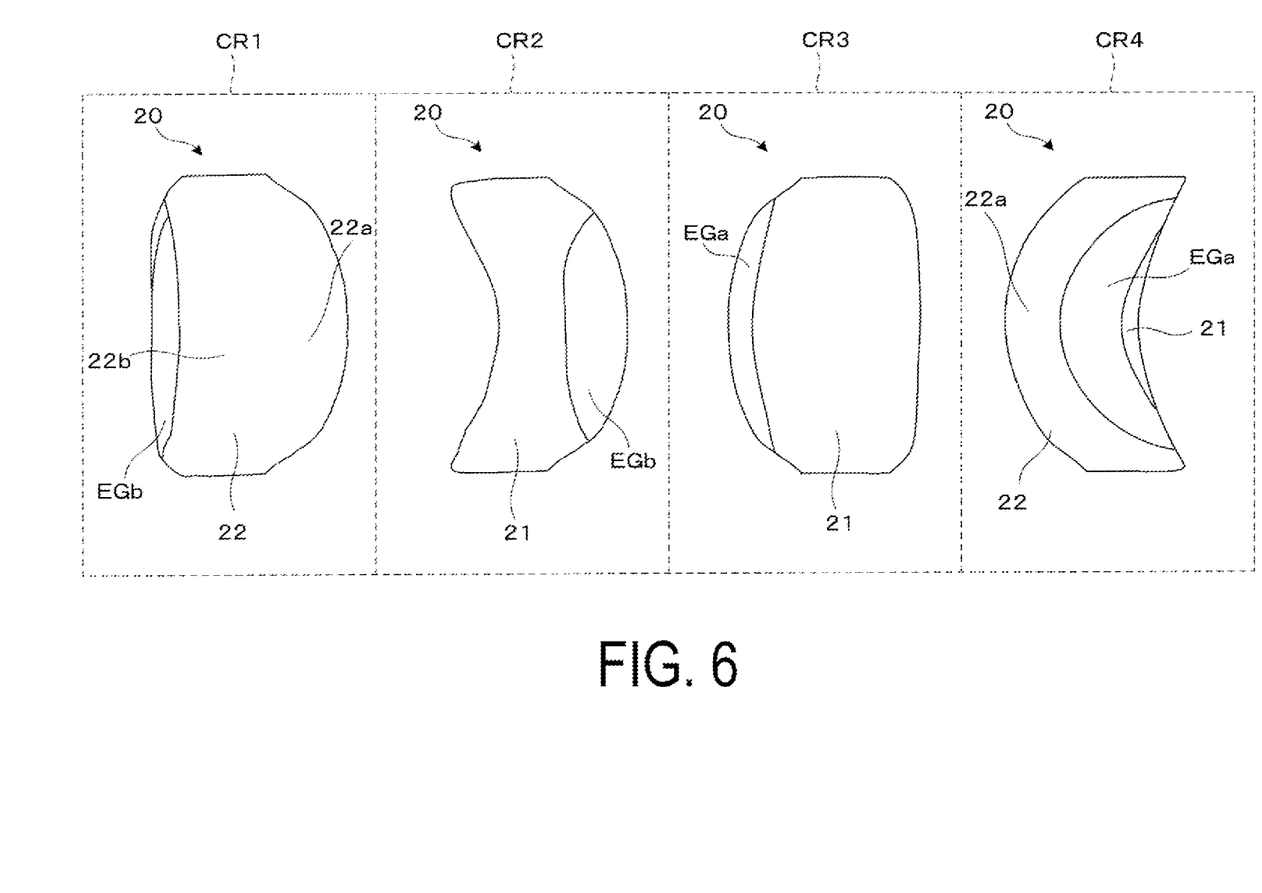
FIG. 6 is a perspective view for describing a configuration example of a prism as an optical member.

FIG. 6 is a diagram for explaining a configuration example of the prism 20 as an optical member. A first region CR1 to a fourth region CR4 are perspective views of the prism 20 viewed from different angles. As illustrated, as described above, the prism 20 has a free-curved surface in the incident portion (incident surface) 21 and the emission portion (emission surface) 22. For example, in the emission portion (emission surface) 22, a concave surface is included in the first emission region 22a, and a convex surface is included in the second emission region 22b. By having such a shape, the optical path range of the image light ML is adjusted, and the miniaturization of the optical system such as the first mirror 31 located at the subsequent stage of the optical path is maintained. Further, as illustrated in FIG. 1, the first mirror 31 and other mirrors are located near the nose NS and a cheek CH of the wearer US at the time of wearing. Therefore, in order not to interfere with these, restrictions on the shape and arrangement become strict. In contrast, in the present exemplary embodiment, by providing the prism 20 as described above in front of the first mirror 31, appropriate optical path adjustment is performed, and the problem of such interference is avoided.

As described above, the virtual image display device 200 according to the present exemplary embodiment includes the display element 10, which is an image light generating unit configured to generate the image light ML, the prism 20, which is an optical member on which the image light ML from the display element (image light generating unit) 10 is incident, the first mirror 31 configured to reflect the image light ML from the prism (optical member) 20, the second mirror 32 configured to reflect the image light ML reflected by the first mirror 31, and the third mirror 33 configured to reflect, toward the position of the exit pupil PP, the image light ML reflected by the second mirror 32, wherein the prism 20 includes the first incident region 21a and the second incident region 21b on which the image light ML from the display element 10 is incident, and the distance from the first incident region 21a to the display element 10 is greater than the distance from the second incident region 21b to the display element 10. In the virtual image display device 200, in the prism 20 on which the image light ML from the display element 10 is incident, by making the distances from the first incident region 21a to the display element 10 greater than the distance from the second incident region 21b to the display element 10, in the first incident region 21a and the second incident region 21b, it is possible to avoid or suppress an increase in the size of a plurality of mirrors (the first mirror 31, etc.) as reflective surfaces provided in the subsequent stage of the optical path of the prism 20, an increase in the size of the first mirror 31 in particular, and an increase in the size of the entire device.

Furthermore, in the case of the above-described aspect, by adopting a free-curved surface as the refractive surface and the reflective surface in each optical system, the occurrence of image distortion (distortion aberration) is suppressed while maintaining the size of each optical system in a small angle. Also, the resolution can be maintained well.

Second Exemplary Embodiment

Hereinafter, a virtual image display device as the virtual image display device according to the second exemplary embodiment will be described with reference to FIG. 7. In addition, a virtual image display device as an example of the virtual image display device according to the present exemplary embodiment is obtained by partially changing the virtual image display device 200 according to the first exemplary embodiment, and a configuration except that the first mirror 31 has an angular dependence is similar to that in the case of the first exemplary embodiment, so that detailed illustration and description of the entire configuration, etc. are omitted, and matters described with reference to other drawings are appropriately incorporated as necessary.

Figure 7:
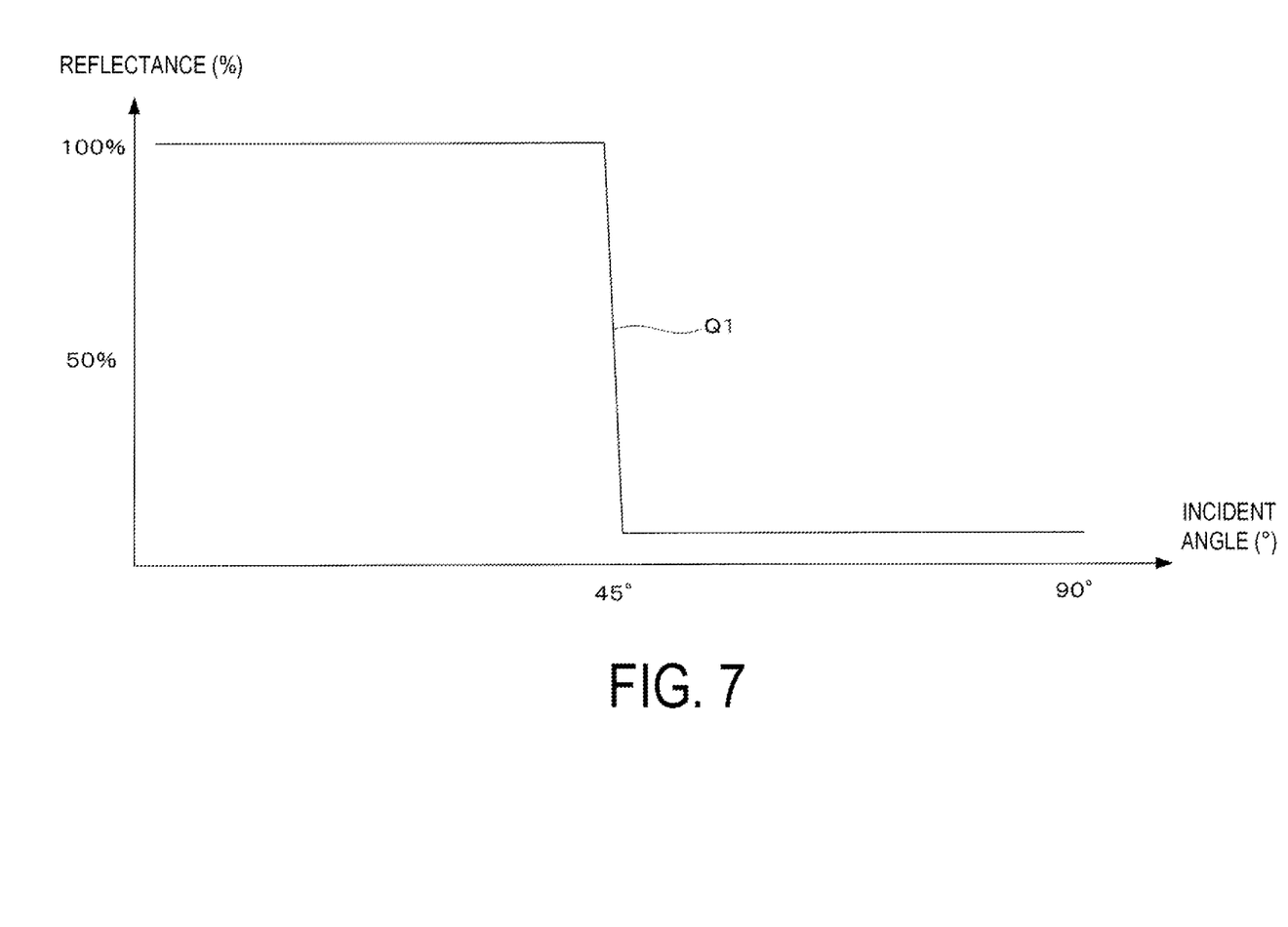
FIG. 7 is a graph for describing an angular dependence of a first mirror included in a virtual image display device according to a second exemplary embodiment.

FIG. 7 is a graph for describing the angular dependence of the first mirror 31 constituting the virtual image display device 200 according to the present exemplary embodiment or the reflective film R1 which is the reflective surface in the first mirror 31. The horizontal axis of the graph indicates the incident angle (unit: °) of the light to the first mirror 31, and the vertical axis indicates the reflectance (unit: %) of the first mirror 31 with respect to the incident angle of the light. As indicated by the curved line (or polygonal line) Q1, the first mirror 31 (reflective film R1) has a characteristic of exhibiting high reflectivity (reflectance) with respect to light incident at an incident angle of 45° or less and exhibiting very low reflectivity (reflectance) with respect to light incident at an angle greater than 45° as an angular dependence. That is, in the first mirror 31 (reflective film R1), the reflectance of light incident at an angle of 45° or less is higher than the reflectance of light incident at an angle greater than 45°. The reflective film R1 having the above-described angular dependence may be formed of, for example, a dielectric multilayer film.

In the case of the first mirror 31 illustrated in FIG. 3, etc., it is assumed that the incident angle of the image light ML incident on the first mirror 31 is relatively small, and even in a case where the image light ML forms an image having a relatively wide angle of view, the maximum incident angle of the image light ML with respect to the first mirror 31 is about 30°. Therefore, in the first mirror 31, if high reflectivity is maintained in a range of at least about 30°, and more desirably, in a range of about 45°, it is considered to be sufficient to secure reflection of the image light ML.

On the other hand, as illustrated in FIG. 3, etc., the reflective film R1 of the first mirror 31 is disposed close to the eye EY and faces upward, that is, is disposed to reflect light in the +Y direction. Therefore, if unintended light such as sunlight is reflected by the first mirror 31, it may be directed toward the eye EY and adversely affect the visual recognition. On the other hand, in the present exemplary embodiment, such a situation can be avoided or suppressed by providing the angular dependence as described above in the first mirror 31 (reflective film R1).

Also in the present exemplary embodiment, it is possible to avoid or suppress an increase in the size of the first mirror 31, etc., and thus to avoid or suppress an increase in the size of the entire device. In addition, in the present exemplary embodiment, the first mirror 31 has an angular dependence in which the reflectance of light incident at an angle of 45° or less is higher than the reflectance of light incident at an angle greater than 45° on the reflective surface (reflective film R1), and thus it is possible to avoid or suppress unintended light from being directed to the eye EY while maintaining high reflectivity for the image light ML.

Third Exemplary Embodiment

Hereinafter, a virtual image display device as the virtual image display device according to the third exemplary embodiment will be described with reference to FIG. 8. In addition, a virtual image display device as an example of the virtual image display device according to the present exemplary embodiment is obtained by partially changing the virtual image display device 200 according to the first exemplary embodiment, and a configuration except that the first mirror 31 and the third mirror 33 are integrated is similar to that in the case of the first exemplary embodiment, so that detailed illustration and description of the entire configuration, etc. are omitted, and matters described with reference to other drawings are appropriately incorporated as necessary.

Figure 2:
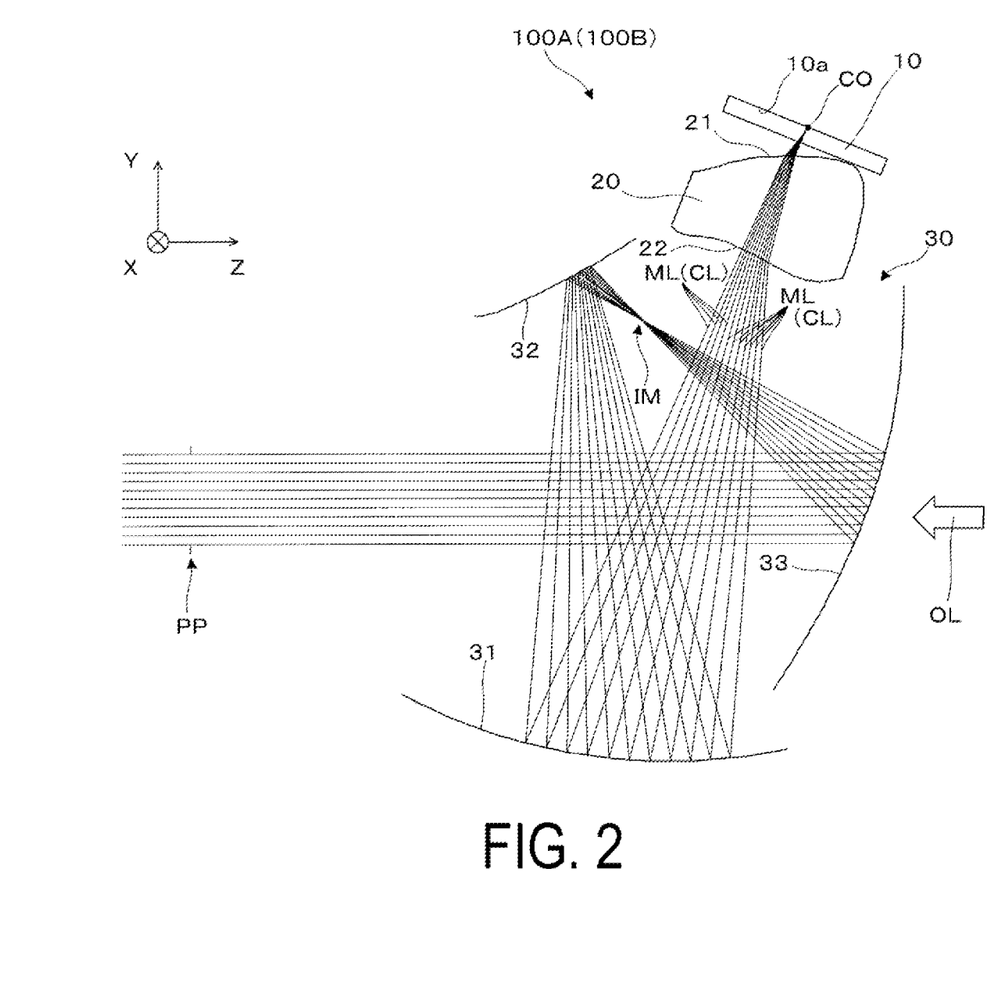
FIG. 2 is a conceptual side cross-sectional view illustrating an optical path of image light in the virtual image display device.
Figure 8:
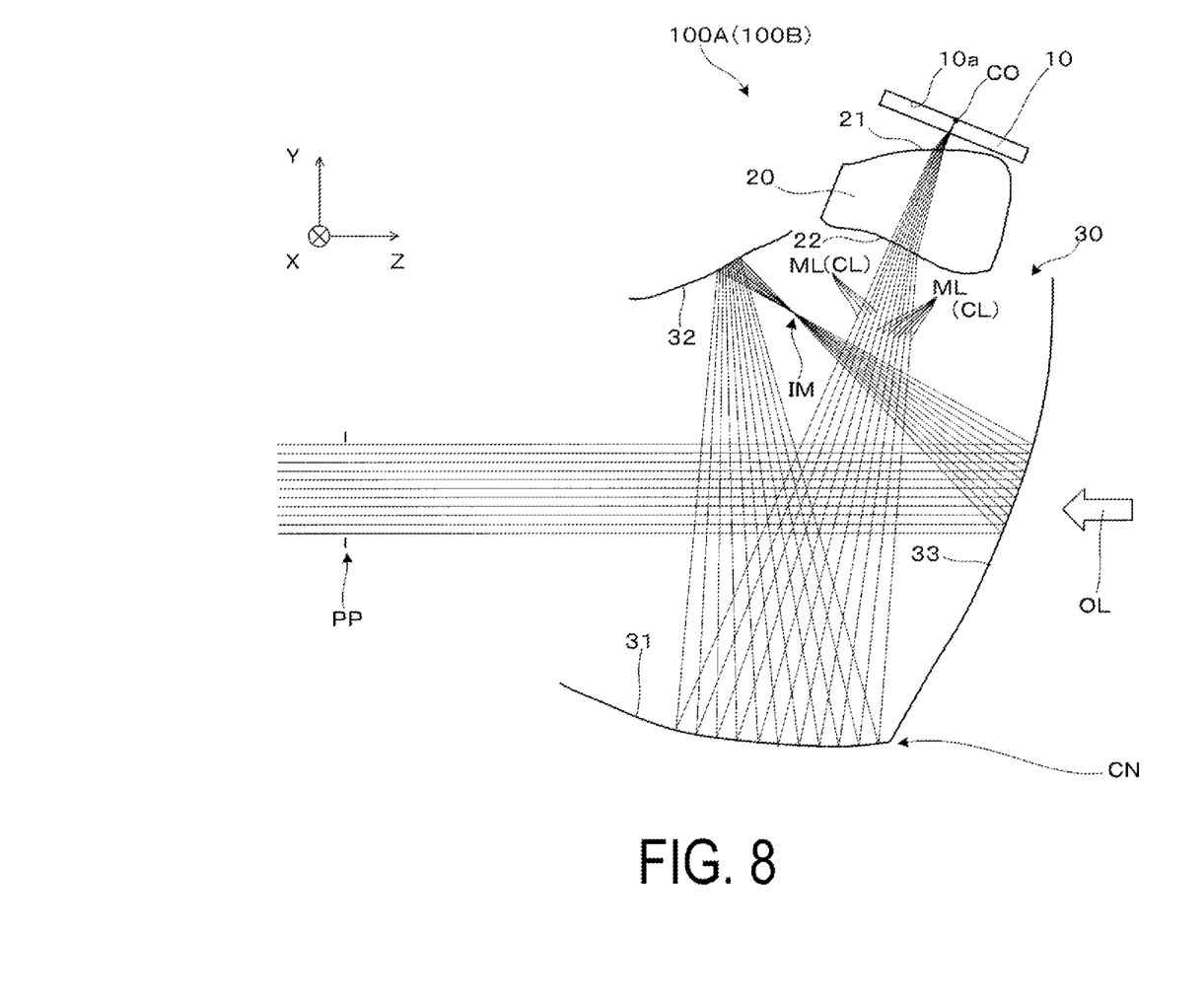
FIG. 8 is a side cross-sectional view schematically illustrating a virtual image display device according to a third exemplary embodiment.

FIG. 8 is a side cross-sectional view schematically illustrating the virtual image display device 200 according to the present exemplary embodiment, and corresponds to FIG. 2. In other words, in FIG. 8, a central light flux (central component CL) of the image light ML emitted from the display element 10 is illustrated. In this case, since the first mirror 31 and the third mirror 33 are integrated, it is easy to maintain assembly accuracy, and it is possible to reduce the number of optical components. In addition, it is possible to inhibit dust, etc. from entering from the gap between the first mirror 31 and the third mirror 33.

By providing a coupling portion CN between the first mirror 31 and the third mirror 33 as a portion through which the image light ML does not pass, it is possible to prevent the coupling portion CN from affecting the light guide of the image light ML.

Also in the present exemplary embodiment, it is possible to avoid or suppress an increase in the size of the first mirror 31, etc., and thus to avoid or suppress an increase in the size of the entire device. Further, in the present exemplary embodiment, it is possible to simplify the maintenance or the assembly accuracy.

Modification Examples and Others

The present disclosure is described according to the above-described exemplary embodiments, but the present disclosure is not limited to the above-described exemplary embodiments. The present disclosure may be carried out in various modes without departing from the gist of the present disclosure, and, for example, the following modifications may be carried out.

First, in the above description, a configuration in which an intermediate image is provided at one place on the optical path is exemplified, but the present disclosure is not limited thereto, and a system in which intermediate images are formed at a plurality of places (two places) may be configured.

In addition, in the above description, the housing CS can have various aspects within a range in which the optical function is not impaired, and for example, as described above, in addition to a configuration in which a member for installation for fixing each optical system at a predetermined position is provided, a configuration having a dust-proof function may be adopted.

In the above description, the virtual image display device 200 has a see-through type configuration in which an image as a virtual image is recognized and an external image is visually recognized or observed. However, the virtual image display device 200 can also be applied to a configuration (so-called close type) in which an external image is not visually recognized.

Although the virtual image display device 200 for both eyes is described above, one of the portions for the right eye and the left eye may be omitted from the virtual image display device 200. That is, the optical system of the virtual image display device 200 can be formed only by the first display device 100A for the right eye and the second display device 100B for the left eye, and in this case, a single-eye type head-mounted display is obtained.

The first virtual image display device according to a specific aspect includes an image light generating unit configured to generate image light, an optical member on which the image light from the image light generating unit is incident, a first mirror configured to reflect the image light from the optical member, a second mirror configured to reflect the image light reflected by the first mirror, and a third mirror configured to reflect, toward a position of an exit pupil, the image light being reflected by the second mirror, wherein the optical member includes a first incident region and a second incident region on which the image light from the image light generating unit is incident, and a distance from the first incident region to the image light generating unit is greater than a distance from the second incident region to the image light generating unit.

In the virtual image display device, in the optical member on which the image light from the image light generating unit is incident, by making the distance from the first incident region to the image light generating unit greater than the distance from the second incident region to the image light generating unit, in the first incident region and the second incident region, it is possible to avoid or suppress an increase in size of the plurality of mirrors (in particular, an increase in size of the first mirror) as reflective surfaces provided in the subsequent stage of the optical member in the optical path and an increase in size of the entire device.

In a specific aspect, a distance from the first incident region to the third mirror is greater than a distance from the second incident region to the third mirror. In this case, since the first incident region is located at a position farther from the third mirror than the second incident region, it is possible to avoid or suppress an increase in size of the plurality or mirrors (in particular, an increase in size or the first mirror) and thus an increase in size of the entire device.

In a specific aspect, the image light incident on the first incident region is refracted more than the image light incident on the second incident region is. In this case, appropriate optical path adjustment can be made for the components of the image light incident on the first incident region.

In a specific aspect, the optical member includes a first end portion extending from the first incident region and configured to form a side surface, and a second end portion extending from the second incident region and configured to form a side surface, and a distance from the first end portion to the third mirror is greater than a distance from the second end portion to the third mirror. In this case, since the first end portion is located at a position farther from the third mirror than the second end portion, it is possible to avoid or suppress an increase in size of the plurality of mirrors (in particular, an increase in size of the first mirror) and thus an increase in size of the entire device.

In a specific aspect, a length of the first end portion of the optical member is smaller than a length of the second end portion of the optical member in cross-sectional view including the first mirror, the second mirror, the third mirror, and the optical member. In this case, the shape difference of the optical member seen in the difference between the first end portion and the second end portion can be used to adjust the appropriate optical path.

In a specific aspect, the optical member includes a first emission region including a concave surface and configured to emit the image light incident from the first incident region, and a second emission region including a convex surface and configured to emit the image light incident from the second incident region. In this case, the shape difference of the optical member found in the emission section can be used to adjust the appropriate optical path.

In a specific aspect, a distance from the first emission region to the third mirror is greater than a distance from the second emission region to the third mirror. In this case, since the first emission region is located at a position farther from the third mirror than the second emission region, it is possible to avoid or suppress an increase in size of the plurality of mirrors (in particular, an increase in size of the first mirror) and thus an increase in size of the entire device.

In a specific aspect, the first mirror has an angle-dependent reflectance. In this case, with respect to the image light, for example, it is possible to avoid or suppress unintended light from being directed toward the wearer while maintaining high reflectivity.

In a specific aspect, in the first mirror, a reflectance of light incident at an angle of 45° or less is higher than a reflectance of light incident at an angle greater than 45°. In this case, even when the image light has a wide angle of view, it is possible to avoid or inhibit unintended light from being directed toward the wearer while maintaining high reflectivity.

In a specific aspect, the first mirror is located below the optical member and the second mirror with respect to a position of the exit pupil, and the first mirror is configured to reflect the image light projected from the optical member to the second mirror located above the exit pupil. In this case, while the light source is disposed at a position where the device is difficult to interfere with the wearer during installation, the optical path can be bent, and the optical system can be configured as a compact configuration while ensuring the optical path of the optical system.

In a specific aspect, the optical member is configured to project, toward the first mirror, the image light to intersect with an optical path of the image light reflected by the second mirror toward the third mirror and an optical path of the image light reflected by the third mirror toward the position of the exit pupil. In this case, it is possible to bend the optical path of the image light a plurality of times and to make the optical system more compact while securing the optical path of the optical system.

In a specific aspect, the optical member and the first mirror collectively function as a convex lens. In this case, by suppressing the spread of the entire light flux, it is possible to avoid or suppress an increase in the size of the optical system even when an image having a wide angle of view is formed.

In a specific aspect, the third mirror is configured to turn back part of the image light and transmit part of external light. In this case, it is possible to visually recognize the so-called see-through.

A specific aspect includes a coupling portion configured to couple the first mirror and the third mirror. In this case, it is possible to simplify the maintenance of the assembly accuracy.

The second virtual image display device according to a specific aspect includes an image light generating unit configured to generate image light, an optical member on which the image light from the image light generating unit is incident, a first mirror configured to reflect the image light from the optical member, a second mirror configured to reflect the image light reflected by the first mirror, and a third mirror configured to reflect, toward a position of an exit pupil, the image light being reflected by the second mirror, wherein the optical member includes a first incident region and a second incident region on which the image light from the image light generating unit is incident, and an incident angle of the image light on the first incident region is greater than an incident angle of the image light on the second incident region.

In the virtual image display device, in the optical member on which the image light from the image light generating unit is incident, by making the incident angle of the image light to the first incident region to be larger than the incident angle of the image light to the second incident region, in the first incident region and the second incident region, it is possible to avoid or suppress an increase in size or the plurality of mirrors (in particular, an increase in size of the first mirror) as reflective surfaces provided in the subsequent stage of the optical member in the optical path and an increase in size of the entire device.

What is claimed is:

1. A virtual image display device comprising:
    an image light generating unit that generates an image light;
    an optical member on which the image light from the image light generating unit is incident;
    a first mirror that reflects the image light from the optical member;
    a second mirror that reflects the image light reflected by the first mirror; and
    a third mirror configured to reflects, toward a position of an exit pupil, the image light being reflected by the second mirror, wherein
    the optical member includes a first incident region and a second incident region on which the image light from the image light generating unit is incident,
    a distance from the first incident region to the image light generating unit is greater than a distance from the second incident region to the image light generating unit,
    the first mirror is located below the optical member and the second mirror with respect to a position of the exit pupil, and
    the first mirror reflects the image light projected from the optical member to the second mirror located above the exit pupil.

2. The virtual image display device according to claim 1, wherein
    a distance from the first incident region to the third mirror is greater than a distance from the second incident region to the third mirror.

3. The virtual image display device according to claim 1, wherein
    the image light incident on the first incident region is refracted more than the image light incident on the second incident region is.

4. The virtual image display device according to claim 1, wherein
    the optical member includes a first end portion extending from the first incident region and that forms a side surface, and a second end portion extending from the second incident region and that forms a side surface, and
    a distance from the first end portion to the third mirror is greater than a distance from the second end portion to the third mirror.

5. The virtual image display device according to claim 4, wherein
    a length of the first end portion of the optical member is smaller than a length of the second end portion of the optical member in cross-sectional view including the first mirror, the second mirror, the third mirror, and the optical member.

6. The virtual image display device according to claim 1, wherein
    the optical member includes a first emission region including a concave surface and that emits the image light incident from the first incident region, and a second emission region including a convex surface and that emits the image light incident from the second incident region.

7. The virtual image display device according to claim 6, wherein
    a distance from the first emission region to the third mirror is greater than a distance from the second emission region to the third mirror.

8. The virtual image display device according to claim 1, wherein
    the first mirror has an angle-dependent reflectance.

9. The virtual image display device according to claim 8, wherein
    in the first mirror, a reflectance of light incident at an angle of 45° or less is higher than a reflectance of light incident at an angle greater than 45°.

10. The virtual image display device according to claim 1, wherein
    the optical member projects, toward the first mirror, the image light, the image light intersecting with an optical path of the image light reflected by the second mirror toward the third mirror and an optical path of the image light reflected by the third mirror toward the position of the exit pupil.

11. The virtual image display device according to claim 1, wherein
    the optical member and the first mirror collectively function as a convex lens.

12. The virtual image display device according to claim 1, wherein
    the third mirror is that turns back part of the image light and transmit part of external light.

13. The virtual image display device according to claim 1, comprising a coupling portion that couples the first mirror and the third mirror.

14. A virtual image display device comprising:
    an image light generating unit that generates an image light;
    an optical member on which the image light from the image light generating unit is incident;
    a first mirror that reflects the image light from the optical member;
    a second mirror that reflects the image light reflected by the first mirror; and
    a third mirror that reflects, toward a position of an exit pupil, the image light being reflected by the second mirror, wherein
    the optical member includes a first incident region and a second incident region on which the image light from the image light generating unit is incident, and
    an incident angle of the image light on the first incident region is greater than an incident angle of the image light on the second incident region,
    the first mirror is located below the optical member and the second mirror with respect to a position of the exit pupil, and the first mirror reflects the image light projected from the optical member to the second mirror located above the exit pupil.

\* \* \* \* \*